(12) United States Patent
Takano et al.

(10) Patent No.: US 11,537,037 B2
(45) Date of Patent: Dec. 27, 2022

(54) LIGHT SOURCE DEVICE, IMAGE PROJECTION APPARATUS, AND LIGHT SOURCE OPTICAL SYSTEM

(71) Applicants: Yohei Takano, Kanagawa (JP); Kazuhiro Fujita, Tokyo (JP); Makoto Hirakawa, Tokyo (JP); Shigeaki Imai, Kanagawa (JP)

(72) Inventors: Yohei Takano, Kanagawa (JP); Kazuhiro Fujita, Tokyo (JP); Makoto Hirakawa, Tokyo (JP); Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/509,106

(22) Filed: Oct. 25, 2021

(65) Prior Publication Data

US 2022/0171267 A1 Jun. 2, 2022

(30) Foreign Application Priority Data

Nov. 27, 2020 (JP) .............................. JP2020-197461

(51) Int. Cl.
*G03B 21/20* (2006.01)
*G02B 27/10* (2006.01)
*G03B 33/12* (2006.01)

(52) U.S. Cl.
CPC ......... *G03B 21/204* (2013.01); *G02B 27/102* (2013.01); *G03B 21/208* (2013.01); *G03B 21/2066* (2013.01); *G03B 33/12* (2013.01)

(58) Field of Classification Search
CPC .......................... G03B 21/204; G03B 21/2066; G03B 21/208; G03B 33/12; G02B 27/102
(Continued)

(56) References Cited

U.S. PATENT DOCUMENTS

2015/0316840 A1 11/2015 Maeda et al.
2016/0223892 A1 8/2016 Takahashi et al.
(Continued)

FOREIGN PATENT DOCUMENTS

EP 3306392 A1 * 4/2018 ......... G03B 21/2013
JP 2014-137406 7/2014
(Continued)

OTHER PUBLICATIONS

EP-3306392-A1 (Year: 2022).*

*Primary Examiner* — Jerry L Brooks
(74) *Attorney, Agent, or Firm* — Xsensus LLP

(57) ABSTRACT

A light source device includes: multiple light source units each including a light source to emit a first color light beam, each of the multiple light source units configured to: convert at least part of the first color light beam into a second color light beam emitted from an emitting region; and emit the second color light beam to form a conjugate image; and a light combiner to combine the conjugate images formed by the multiple light source units to form a combined image, in which the conjugate images partially overlap each other, on a plane of an entrance surface of a light uniformizing element along a central axis of the light uniformizing element. A conditional expression below is satisfied:

$$1.3 > SC/SI > 0.7$$

where SC is an area of the combined image, and SI is an area of the entrance surface of the light uniformizing element.

10 Claims, 9 Drawing Sheets

(58) Field of Classification Search
USPC .......................................................... 353/31
See application file for complete search history.

(56) References Cited

U.S. PATENT DOCUMENTS

| | | |
|---|---|---|
| 2016/0320692 A1 | 11/2016 | Takahashi et al. |
| 2016/0344986 A1 | 11/2016 | Hirakawa |
| 2016/0349606 A1 | 12/2016 | Nishimori et al. |
| 2016/0377969 A1 | 12/2016 | Nishimori et al. |
| 2017/0299953 A1 | 10/2017 | Maeda et al. |
| 2018/0024425 A1 | 1/2018 | Fujita et al. |
| 2019/0129288 A1 | 5/2019 | Maeda et al. |
| 2020/0064719 A1 | 2/2020 | Nakamura et al. |
| 2020/0201158 A1 | 6/2020 | Maeda et al. |
| 2020/0301260 A1 | 9/2020 | Takano et al. |
| 2020/0301266 A1 | 9/2020 | Nakamura et al. |
| 2021/0136336 A1 | 5/2021 | Takano et al. |
| 2021/0173290 A1 | 6/2021 | Takano et al. |
| 2021/0200075 A1 | 7/2021 | Nakamura et al. |

FOREIGN PATENT DOCUMENTS

| | | |
|---|---|---|
| JP | 2017-142482 | 8/2017 |
| JP | 2021-071691 | 5/2021 |

\* cited by examiner

LIGHT SOURCE DEVICE, IMAGE PROJECTION APPARATUS, AND LIGHT SOURCE OPTICAL SYSTEM

CROSS-REFERENCE TO RELATED APPLICATIONS

This patent application is based on and claims priority pursuant to 35 U.S.C. § 119(a) to Japanese Patent Application No. 2020-197461, filed on Nov. 27, 2020, in the Japan Patent Office, the entire disclosure of which is incorporated by reference herein.

BACKGROUND

Technical Field

The present disclosure relates to a light source device, an image projection apparatus, and a light source optical system.

Related Art

Projectors (image projection apparatuses) that magnify and project various images on to a screen are widely used. In projectors, light emitted by a light source is condensed on a spatial light modulator such as a digital micromirror device (DMD) or a liquid crystal display through an illumination optical system, and the light condensed on the spatial light modulator is modulated by the spatial light modulator according to image signals to generate modulated light, and the modulated light is displayed (projected) onto a screen through a projection optical system as a color image.

Projectors have used, for example, an ultra-high pressure mercury lamp having high brightness as a light source. However, the life of such a lamp is shorter and frequent maintenance is required. In recent years, the number of projectors using a laser or a light emitting diode (LED), instead of the ultra-high pressure mercury lamp is growing. Such projectors using a laser or an LED as a light source have a longer life and higher color reproducibility due to its monochromaticity than the ultra-high pressure mercury lamp.

SUMMARY

A light source device includes: multiple light source units each including a light source configured to emit a first color light beam, each of the multiple light source units configured to: convert at least part of the first color light beam into a second color light beam emitted from an emitting region; and emit the second color light beam to form a conjugate image; and a light combiner configured to combine the conjugate images formed by the multiple light source units to form a combined image, in which the conjugate images partially overlap each other, on a plane at a position of an entrance surface of a light uniformizing element along a central axis of the light uniformizing element. A conditional expression below is satisfied:

$$1.3 > SC/SI > 0.7$$

where SC is an area of the combined image in which a light intensity is equal to or greater than $1/e^2$ of a peak intensity of the conjugate images on the plane at the position of the entrance surface of the light uniformizing element, and SI is an area of the entrance surface of the light uniformizing element.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

In describing embodiments illustrated in the drawings, specific terminology is employed for the sake of clarity.

However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

Embodiments of the present disclosure achieve a compact image projection apparatus and a higher light use efficiency of the image projection apparatus.

In projectors, a color image is formed by irradiating an image display element such as a DMD with color light, for example red, green, and blue (i.e., three primary colors of light). These three colors can be generated by using laser light sources for the colors. However, this is not desirable because luminous efficacies of a green laser and a red laser are lower than efficacy of a blue laser. Thus, a method using a phosphor and a blue laser as excitation light is used. In the method, blue light emitted by the blue laser hits the phosphor to generate fluorescence (i.e., wavelength conversion), which generates green light and red light.

Hereinafter, embodiments of a light source device, an image projection apparatus, and a light source optical system are described in detail with reference to the accompanying drawings.

Figure 1:
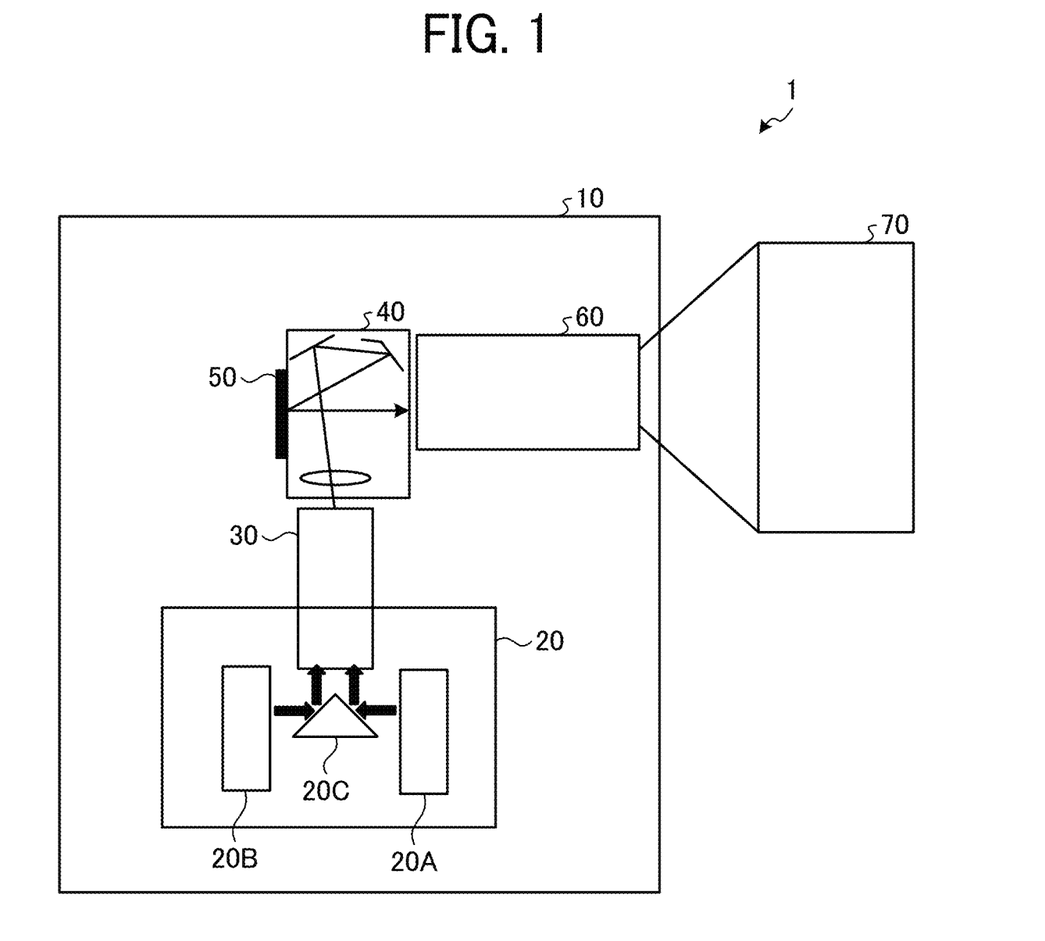
FIG. 1 is an illustration of an overall configuration of a projector (i.e., an image projection apparatus) according to a first embodiment of the present invention.

First Embodiment FIG. 1 is an illustration of an overall configuration of a projector 1 (i.e., an image projection apparatus) according to a first embodiment of the present invention.

The projector 1 includes a housing 10, a light source device 20, a light uniformizing element 30, an illumination optical system 40, an image forming element 50 (image display element), and a projection optical system 60.

The housing 10 houses the light source device 20, the light uniformizing element 30, the illumination optical system 40, the image forming element 50, and the projection optical system 60.

The light source device 20 emits light having wavelengths corresponding to colors of, for example, red, green, and blue (RGB). The light source device 20 includes a light source unit 20A, a light source unit 20B, and an optical-path combining element 20C, a light combining element, or light combiner. The light source unit 20A and the light source unit 20B have the same configuration and emit light having a predetermined shape. The internal configuration of the light source unit 20A and the light source unit 20B is described in detail later. The light beams emitted from the light source unit 20A and the light source unit 20B are deflected by the optical-path combining element 20C and enter an entrance surface of the light uniformizing element 30, respectively. In the present embodiment, a prism is used as an example of the optical-path combining element 20C, but the optical-path combining element 20C is not limited thereto.

In the present embodiment, the light source device 20 using two light source units 20A and 20B is described as an example, but the light source device 20 is not limited thereto. Two or more light source units, for example, four light source units, may be used in the light source device 20 to combine optical paths.

The light uniformizing element 30 mixes multiple light beams emitted from the light source device 20 to uniformize the light intensities of the light beams. More specifically, the light beams entered into the entrance surface of the light uniformizing element 30 propagate while repeating reflection in the light uniformizing element 30, and exit from an exit surface of the light uniformizing element 30. The light uniformizing element 30 causes the light beams incident through the entrance surface to reflect multiple times inside to uniformize the intensities of the light beams, thus forming a surface light source that emits a light beam having a uniform intensity on the exit surface. Examples of the light uniformizing element 30 include: a light tunnel enclosed by four mirror plates with their mirrors facing inside, which is a hollow tunnel; a rod integrator that is a prism of transparent material such as glass; and a fly-eye lens is used.

The illumination optical system 40 substantially evenly illuminates the image forming element 50 with illumination light uniformized (i.e., the light having the intensity uniformized) by the light uniformizing element 30. The illumination optical system 40 includes, for example, at least one lens and at least one optical element having at least one reflection surface.

The image forming element 50 is a light valve (spatial light modulator) such as a digital micromirror device (DMD), a transmissive liquid crystal panel, or a reflective liquid crystal panel. The image forming element 50 modulates the illumination light with which the illumination optical system 40 illuminates the image forming element 50 (i.e., light emitted by a light source optical system in the light source device 20) to form an image.

The projection optical system 60 magnifies and projects the image formed by the image forming element 50 onto a screen (i.e., projection surface) 70. The projection optical system 60 includes, for example, at least one lens.

Figure 2:
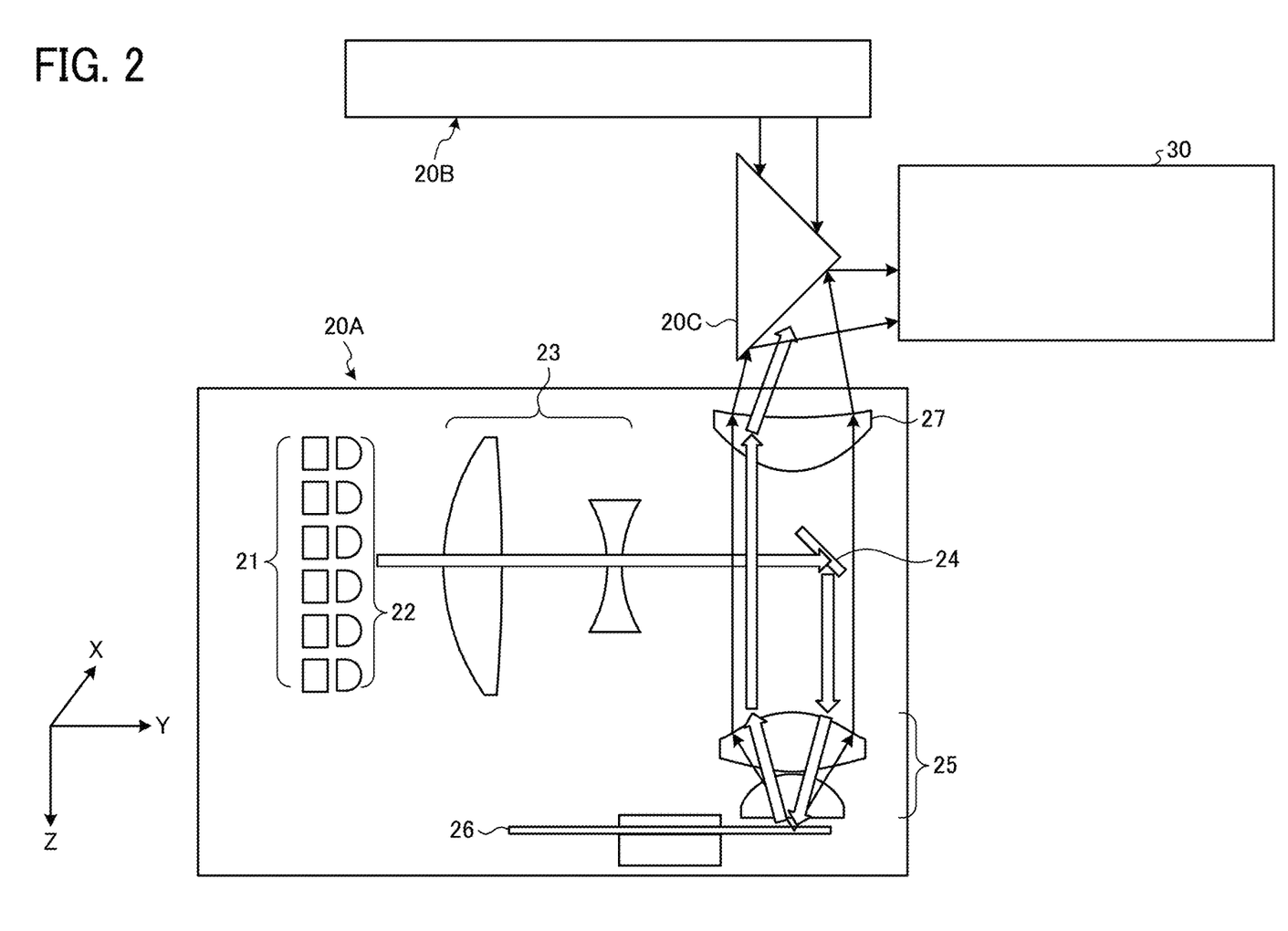
FIG. 2 is an illustration of a configuration of a light source unit.

FIG. 2 is an illustration of a configuration of the light source unit 20A. The light source unit 20B has the same configuration as the light source unit 20A.

The light source unit 20A (20B) includes a laser light source group 21 (excitation light source group), a collimator lens group 22 provided corresponding to each laser light source, a first lens group 23, a dichroic mirror 24, a second lens group 25, a wavelength conversion element 26 (phosphor wheel) or a wavelength converter, and a third lens group 27, which are arranged in this order along the light propagation direction. The wavelength conversion element 26 (phosphor wheel) may include a reflective region. All the elements except the laser light source group 21 in light source device 20 constitutes a light source optical system. In the light source unit 20A (20B), the laser light source group 21 (excitation light source group), the collimator lens group 22, the first lens group 23, the dichroic mirror 24, the second lens group 25, the wavelength conversion element 26, and the third lens group 27 are arranged in this order along the direction of propagation of light (excitation light) emitted from the laser light source group 21.

The laser light source group 21 includes one or more light sources (emission spots). The collimator lens group 22 includes one or more collimator lenses. In FIG. 2, six light sources arranged in the vertical direction (i.e., z-direction) are illustrated, but actually, six light sources are arranged in four rows in the direction orthogonal to the vertical direction (i.e., x-direction). Thus, 24 (6×4) light sources are two-dimensionally arranged. Each light source of the laser light source group 21 emits, for example, light having a center wavelength of 455 nm in emission intensity (i.e., blue laser light) as excitation light to excite the phosphor included in the wavelength conversion element 26.

The blue laser light (first color light) emitted by each light source of the laser light source group 21 is linearly polarized light having a constant polarization state and is arranged to emit s-polarized light toward the dichroic mirror 24. The blue laser light emitted by each light source of the laser light source group 21 is coherent light. The excitation light emitted by each laser light source of the laser light source group 21 has any wavelength that excites the phosphor included in the wavelength conversion element 26. The excitation light is not limited to light of a wavelength band of blue.

In the embodiment, the laser light source group 21 uses multiple laser light sources, but a single laser light source may be used instead. The laser light source group 21 may use a light source unit in which light sources are arranged in an array on a substrate, but is not limited thereto.

The collimator lens group 22 includes, for example, 24 collimator lenses corresponding to the 24 light sources of the laser light source group 21. Each collimator lens of the collimator lens group 22 is adjusted to substantially collimate the excitation light emitted by its corresponding light source of the laser light source group 21. The both numbers coincide with each other, and the number of the collimator lenses of the collimator lens group 22 may be increased or decreased in proportional to the number of light sources of the laser light source group 21.

The excitation light emitted from the laser light source group 21 is made substantially parallel by the collimator lenses corresponding to the light sources of the laser light source group 21. The substantially parallel excitation light passes through the first lens group 23 and is guided to the dichroic mirror 24.

The dichroic mirror 24 is, for example, a parallel flat plate of glass having a coting. The coating is on a light incident surface of the dichroic mirror 24. The coating reflects s-polarized light (first polarized light component) in a wavelength band of the excitation light guided through the first lens group 23 and transmits p-polarized light (second polarized light component) in the wavelength band of the excitation light guided from the first lens group 23 and fluorescence (second color light) from the wavelength conversion element 26.

The dichroic mirror 24 is arranged with its center offset relative to the optical axis of the second lens group 25, and the excitation light hits the dichroic mirror 24 at an angle with respect to the normal line of the wavelength conversion element 26.

The dichroic mirror 24 of the parallel flat plate is used in the present embodiment. In another embodiment, a dichroic prism may be used instead. In the present embodiment, the dichroic mirror 24 reflects s-polarized light and transmits p-polarized light in the wavelength band of the excitation light. On the contrary, the dichroic mirror 24 may reflect p-polarized light and transmit s-polarized light in the wavelength band of the excitation light.

The excitation light reflected by the dichroic mirror 24 is guided to the wavelength conversion element 26 through the second lens group 25. The excitation light reflected by the reflective region of the wavelength conversion element 26 passes through the second lens group 25 again and an empty space at the opposite side of the dichroic mirror 24 with respect to the optical axis of the second lens group 25. The excitation light passed through the empty space further passes through the third lens group 27 and is deflected by the optical-path combining element 20C. The excitation light deflected by the optical-path combining element 20C enters the light uniformizing element 30.

The excitation light hits the wavelength conversion element 26 to emit fluorescence. The fluorescence emitted by the wavelength conversion element 26 is guided to the light uniformizing element 30 via the optical-path combining element 20C. More specifically, the fluorescence emitted by the wavelength conversion element 26 is converted into substantially parallel light by the second lens group 25 and refracted by the third lens group 27 to be condensed in the vicinity of the entrance surface of the light uniformizing element 30. The fluorescence refracted by the third lens group 27 is deflected by the optical-path combining element 20C and enters the light uniformizing element 30.

In recent years, higher brightness and higher efficiency for laser projectors have been strongly demanded by users. Conversion efficiency of a phosphor varies with energy density of the excitation light incident on the phosphor. If the energy density of light incident on the phosphor is high, the conversion efficiency decreases because of an increase in temperature of the phosphor or a decrease in the number of excitable electrons in a layer of the phosphor. Then, the conversion efficiency of the phosphor is increased by uniformizing the energy density as much as possible and increasing the spot size of the excitation light on the phosphor.

However, if the spot size of the excitation light on the phosphor is increased to lower the energy density of the excitation light, vignetting of light increases in a subsequent optical system. As a result, the light use efficiency of the entire projector decreases. The light use efficiency can be increased by using a projection lens having a smaller f-number, but the projection lens becomes excessively larger, and the size of the entire projector also becomes larger. As a result, marketability of projectors decreases.

To avoid such circumstances, in one or more embodiments, the energy density is uniformized and the spot size is optimized to increase the light use efficiency of the projector.

In addition, the energy of the excitation light incident on the phosphor increases as the brightness increases, and the temperature of the phosphor increases. As a result, the conversion efficiency of the phosphor decreases.

In one or more embodiments, a temperature rise of the phosphor is suppressed by dividing the spot of the excitation light, and the spot size of the phosphor and the magnification of a light source optical system are determined by substantially equalizing the area of the combined image formed by combining the generated fluorescence, with the area of the entrance surface of the light uniformizing element 30. The spot size of the phosphor is adjusted to a preferable size by the size of the laser light source group 21 and appropriate optical designs of each lens of the collimator lens group 22 and the first lens group 23. The magnification of the light source optical system is adjusted to a preferable magnification by appropriate optical designs of the second lens group 25 and the third lens group 27.

In one or more embodiments, when multiple conjugate images each formed by the fluorescence (second color light) from corresponding emitting regions on the wavelength conversion element 26 are combined at least partially overlapping each other to form a combined image on a plane at the position of the entrance surface of the light uniformizing element 30, a conditional expression (1) below is satisfied.

$$1.3 > SC/SI > 0.7 \qquad (1)$$

where SC is an area of the combined image in which a light intensity is equal to or greater than $1/e^2$ of a peak intensity of the conjugate images on the plane at the position of the entrance surface of the light uniformizing element, and SI is an area of the entrance surface of the light uniformizing element.

The conditional expression (1) defines an appropriate range of the area of the combined image formed by combining conjugate images each formed by the fluorescence (second color light) from the emitting regions on the wavelength conversion element 26, on the plane at the position of the entrance surface of the light uniformizing element 30. The area of the combined images has light intensities equal to or greater than $1/e^2$ of the peak intensity in the conjugate images formed on the plane at the position of the entrance surface of the light uniformizing element 30. The entrance surface of the light uniformizing element 30 is one end face of the light uniformizing element 30, on which second color light is incident and perpendicular to the central axis of the light uniformizing element 30 along of a light guide direction thereof. The exit surface of the light uniformizing element 30 is the other end face thereof. The plane on which the conjugate images are formed is a virtual plane at substantially the same position as the entrance surface along the central axis (i.e., the optical axis) of the light uniformizing element 30 and includes the entrance surface. The area of the combined image is defined on the plane at the position of the entrance surface. When the light uniformizing element 30 is a light tunnel, the entrance surface is an entrance of light, in which the entrance (and the exit) is open-ended. When the light uniformizing element 30 is an optical element, which is a single integrate unit formed by combining a glass rod and a prism, the entrance surface is one end face of the glass rod, which is a glass surface.

When SC/SI of the conditional expression (1) is 1.3 or greater, the area of the combined image is larger than the area of the entrance surface of the light uniformizing element 30. This causes vignetting of some part of the combined image and reduces the light use efficiency of the entire optical system. In addition, light failing to enter the light uniformizing element 30 because of the vignetting enters, for example, the projection optical system 60 as stray light, resulting in a decrease in the contrast ratio of the projector.

When SC/SI of the conditional expression (1) is 0.7 or less, vignetting in the light uniformizing element 30 is eliminated, but the incident angle of light incident of the light uniformizing element 30 becomes larger. As a result, etendue representing geometrical spread of the light becomes large. When the etendue becomes larger, light use efficiency decreases because of vignetting in the projection optical system 60, or the size of the projection apparatus increases because of the use of the projection optical system 60 having a smaller f-number to capture geometrically spread light.

Etendue (Et) is a property of light and defined by a following equation, $$Et=\pi \times S \times (NA)^2$$

where S is the area of the light source and NA is numerical aperture (f-number=½NA). If S is constant, etendue depends on numerical aperture (NA) and represents geometrical spread of light. In contrast, if NA is constant, etendue depends on the area of the light source S and represents the size of light source.

In one or more embodiments, a conditional expression (2) below is satisfied.

$$1.2>SC/SI>0.8 \tag{2}$$

In one or more embodiments, a conditional expression (3) below is satisfied.

$$1.1>SC/SI>0.9 \tag{3}$$

In one or more embodiments, the combined image has substantially the same shape as that of the entrance surface of light uniformizing element 30. Herein, "substantially the same shape" is achieved: by an optical system in which aberrations are generally corrected; and within general manufacturing tolerances for optical elements, optical units, optical devices, optical apparatuses, and optical systems. By appropriately setting the shape and magnification of the emitting regions of the second color light to allow the combined image combined by the optical-path combining element 20C to substantially coincide with the shape of the entrance surface of the light uniformizing element 30, vignetting in the light uniformizing element 30 is reduced, and the emitting regions of the fluorescence is maximized within the possible range, thus preventing the conversion efficiency of phosphor from decreasing.

For example, when the shape of the entrance surface of the light uniformizing element 30 is a rectangle, the shape of the combined image is also a rectangle. The shape of the emitting region of the second color light for each conjugate image is not limited to a rectangle, and may be a triangle, a rectangle, or a polygon. Alternatively, the emitting regions of the second light for the conjugate images may have any shape formed by a combination of any different shapes.

In one or more embodiments, a conditional expression (4) below is satisfied.

$$0.1<I0/Iave<1.2 \tag{4}$$

where I0 is light intensity of the second color light in an overlap between multiple conjugate images on the plane at the position of the entrance surface of the light uniformizing element 30, and Iave is an average of the light intensities equal to or greater than $1/e^2$ of the peak value of the light intensities of the conjugate images combined on the plane at the position of the entrance surface of the light uniformizing element 30. The conditional expression (4) defines an appropriate range of the overlap between the conjugate images of the second color light. In the overlap between multiple conjugate images, I0 is a peak or bottom intensity in the overlap.

When I0/Iave of the conditional expression (4) is 0.1 or less, the area of the combined image on the entrance surface of the light uniformizing element 30 becomes larger and the etendue also becomes larger. As a result, the light use efficiency decreases, the size of the projection optical system increases, or the efficiency of capturing light by the light uniformizing element 30 decreases.

In contrast, when I0/Iave of the conditional expression (4) is 1.2 or greater, the incident angle relative to the light uniformizing element 30 increases and the etendue also increases.

In one or more embodiments, a conditional expression (5) below is satisfied.

$$0.8<NAI/NAO<1.2 \tag{5}$$

where NAI is a numerical aperture of each of multiple second light beams incident on the light uniformizing element 30, which are emitted from the multiple light source units, respectively, and NAO is a numerical aperture of outgoing light emitted by the light uniformizing element 30.

By satisfying the conditional expression (3), the optical paths are combined with the etendue kept small. This achieves an increase in the light use efficiency, and a reduction in the size of the image projection apparatus without reducing the conversion efficiency.

In one or more embodiments, the directions of emission of at least two of the second color light beams emitted from the light source units 20A and 20B are substantially parallel to each other. Herein, "substantially parallel to each other" is achieved by an optical system in which aberrations are generally corrected; and within general manufacturing tolerances for optical elements, optical units, optical devices, optical apparatuses, and optical systems. By arranging the light source units 20A and 20B in parallel to each other as described above, the configuration of the light source device is simplified and the image projection apparatus is miniaturized.

In one or more embodiments, the multiple light source units 20A and 20B that respectively emit the second color light beams are symmetrically arranged with respect to the center axis of the light uniformizing element 30 (i.e., symmetrical arrangement). Such a symmetrical arrangement allows the optical paths of the opposite conjugate images to be coincide with each other, and thus improves the uniformity of the intensities of the second color light beams.

In one or more embodiments, at least two conjugate images of the second color light beams emitted from multiple light source units 20A and 20B have substantially the same shape. Herein, "substantially the same shape" is achieved: by an optical system in which aberrations are generally corrected; and within general manufacturing tolerances for optical elements, optical units, optical devices, optical apparatuses, and optical systems. By using common optical elements for multiple light source units such as the light source units 20A and 20B, cost is also reduced.

In one or more embodiments, a conditional expression (6) below is satisfied.

$$0 \leq \theta < 10 \text{ degrees} \quad (6)$$

where θ (degree) is an incident angle of a principal ray of the second color light emitted from each of multiple light source units 20A and 20B with respect to the normal line of the light uniformizing element 30.

The conditional expression (6) defines an appropriate range of the incident angle of each second color light incident on the entrance surface of the light uniformizing element 30. In other words, the conditional expression (6) defines an appropriate range of the incident angle between the normal line of the light uniformizing element 30 and the principal ray of each second color light incident on the entrance surface of the light uniformizing element 30. The principal ray refers to a center line of a bundle of rays of each second color light. When the incident angle satisfies the conditional expression (6), an increase in etendue is prevented. As a result, an increase in the size of the entire optical system and a decrease in light use efficiency are prevented.

Figure 3:
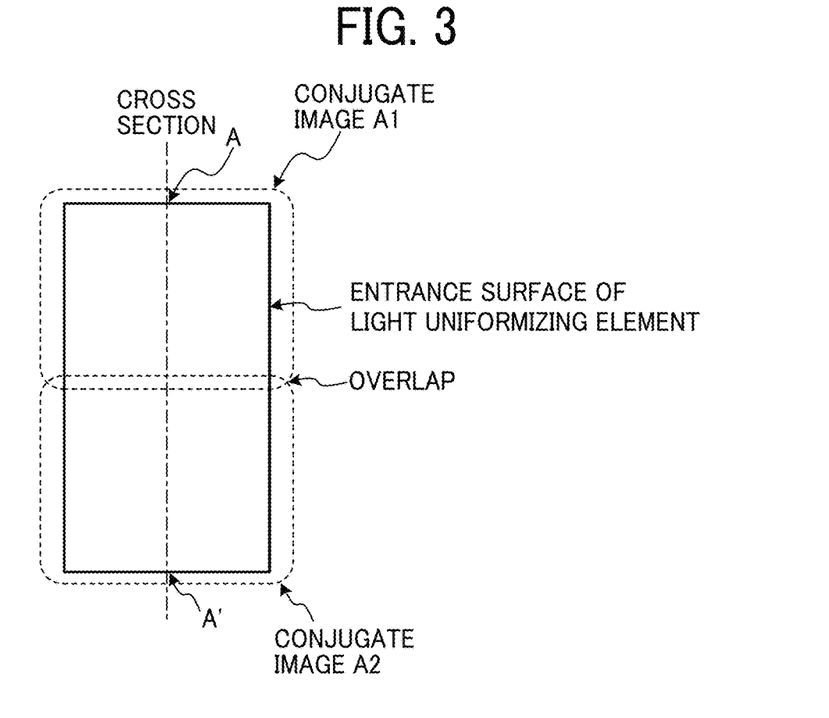
FIG. 3 is an illustration of a combined image of conjugate images on a plane at the position at an entrance surface of a light uniformizing element.

FIG. 3 is an illustration of a combined image of conjugate images on the plane at the position of the entrance surface of the light uniformizing element 30. In FIG. 3, the entrance surface of the light uniformizing element 30 is depicted by a solid line, and the conjugate images each formed by the second color light emitted from corresponding light sources of the laser light source group 21 are depicted by dashed lines.

As illustrated in FIG. 3, the conjugate images each corresponding to the light sources of the laser light source group 21 are combined on the plane at the position of the entrance surface of the light uniformizing element 30 to overlap each other, and the area SC of the combined image is slightly larger than the area SI of the light uniformizing element 30. In the present embodiment, the ratio of SC with respect to SI (SC/SI) is 1.05.

In the present embodiment, each conjugate image has the same shape, but each conjugate image may have different shape.

Figure 4:
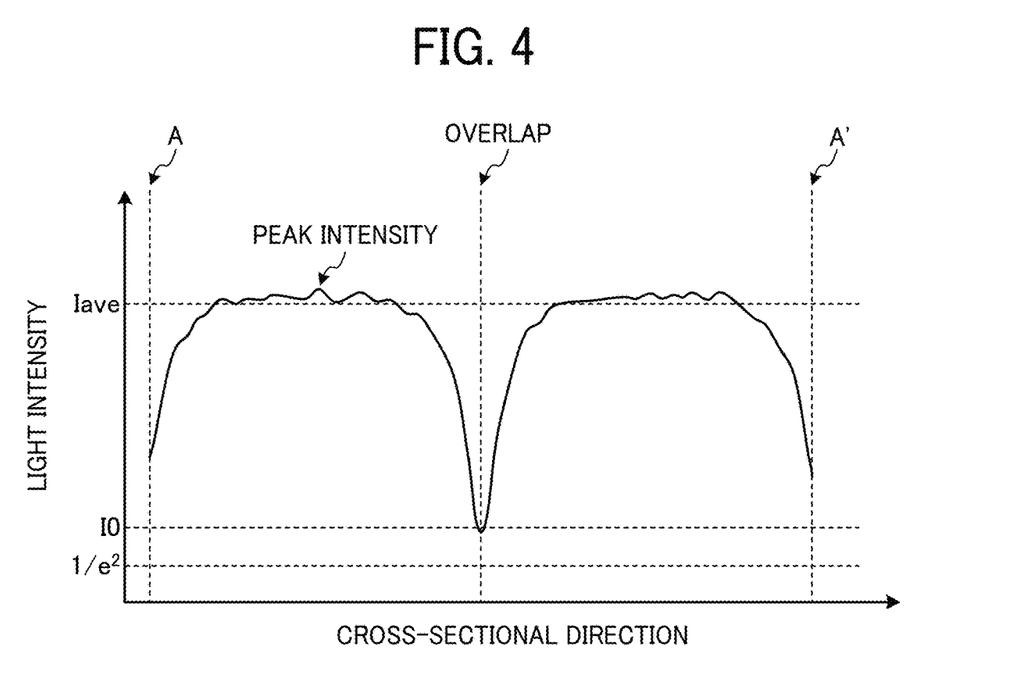
FIG. 4 is a graph of a cross-sectional profile of a distribution of light intensity of the combined image on the plane at the position of the entrance surface of the light uniformizing element.

FIG. 4 is a graph of a cross-sectional profile of the distribution of the light intensity of the combined image on the plane at the position of the entrance surface on light uniformizing element 30. The cross-sectional profile of the distribution of the light intensity is a cross-section taken along the chain line A-A' in FIG. 3.

The graph in FIG. 4 indicates that the light intensity on the plane at the position of the entrance surface of the light uniformizing element 30 drops in the overlap between the conjugate images. In the present embodiment, the ratio of I0 to Iave (I0/Iave) is 0.45, where Iave is an average of the light intensities equal to or greater than $1/e^2$ of the peak intensity of the conjugate images, and I0 is light intensity (i.e., the bottom of the intensities) in the overlap.

Figure 5:
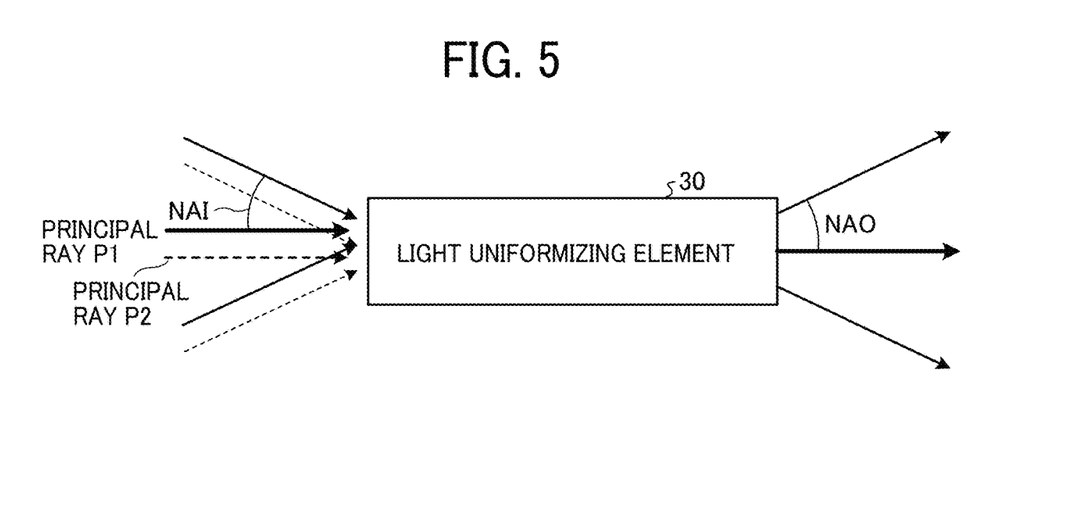
FIG. 5 is an illustration of bundles of rays from each light source unit and a bundle of rays emitted by the light uniformizing element.

FIG. 5 is an illustration of bundles of rays from the light source units 20A and 20B and a bundle of rays emitted by the light uniformizing element 30. In FIG. 5, a bundle of rays from the light source unit 20A are depicted by solid lines, and a bundle of rays from the light source unit 20B is depicted by dashed lines. The center line of each bundle of rays from each of the light source units 20A and 20B indicates a principal ray.

In the present embodiment, as illustrated in FIG. 5, the ratio of NAI to NAO (NAI/NAO) is 1.0, where NAI is a numerical aperture of the light incident on the entrance surface of the light uniformizing element 30 after emitted from each of the light source units 20A and 20B, and NAO is a numerical aperture of the outgoing light emitted from the exit surface of the light uniformizing element 30.

In the present embodiment, the incident angle θ is zero, meaning that the principal ray is perpendicular to the entrance surface of the light uniformizing element 30, where the incident angle θ is defined by an angle between the principal ray and a normal line of the entrance surface.

This configuration allows the numerical aperture of the light incident on the entrance surface to be equal to the numerical aperture of the light emitted from the exit surface of the light uniformizing element 30, and thus enables etendue that represents geometrical spread of light remain constant.

The configuration according to the present embodiment achieves miniaturization of the image projection apparatus and improves the light use efficiency.

Second Embodiment

The second embodiment is different from the first embodiment in a cross-sectional profile of the combined image, the incident angle of light incident on the light uniformizing element 30, and the area of the combined image. Hereinafter, in a description on the second embodiment, the common descriptions for the first and the second embodiments are omitted, and the differences therebetween are described.

Figure 6:
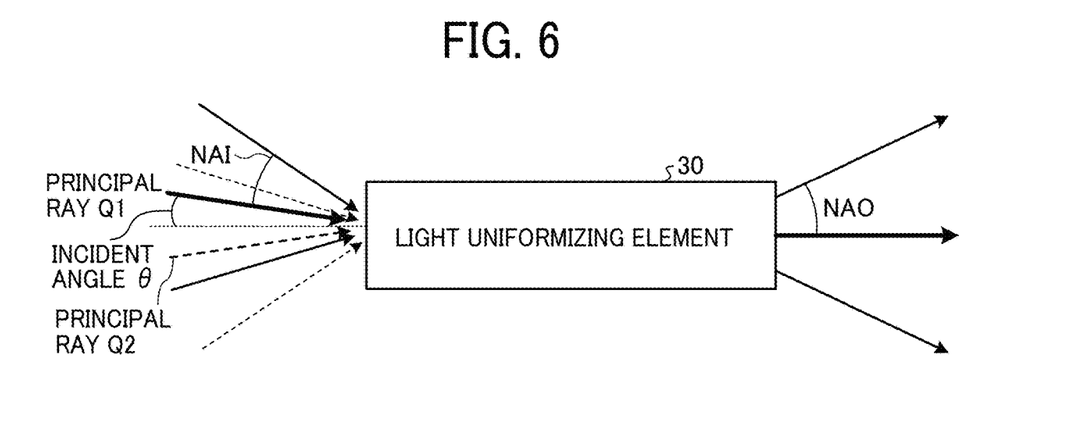
FIG. 6 is an illustration of bundles of rays from each light source unit of a light source device and a bundle of rays emitted by a light uniformizing element in a projector according to a second embodiment of the present invention.

FIG. 6 is an illustration of bundles of rays from the light source units 20A and 20B of the light source device 20 included in the projector 1 according to the second embodiment and a bundle of rays emitted by the light uniformizing element 30. As illustrated in FIG. 6, in the light source device 20 of the present embodiment, unlike the first embodiment in FIG. 5, the incident angle θ of the principal ray (P1, P2), which is the center line of each bundle of rays from each light source units 20A and 20B, is tilted by 3 degrees with respect to the normal line of the entrance surface of the light uniformizing element 30.

Figure 7:
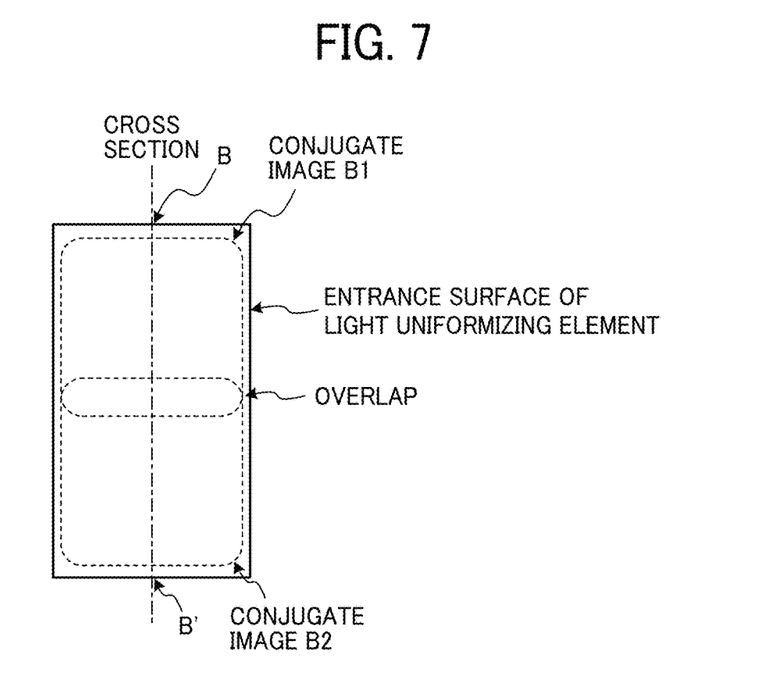
FIG. 7 is an illustration of a combined image of conjugate images on the plane at the position of the entrance surface of the light uniformizing element.

FIG. 7 is an illustration of a combined image of conjugate images on the plane at the position of the entrance surface of the light uniformizing element 30. As illustrated in FIG. 7, when incident light from each of the light source units 20A and 20B of the light source device 20 (i.e., the principal ray (Q1, Q2)) slightly obliquely enters the light uniformizing element 30, the area of the overlap between the conjugate images on the plane at the position of the entrance surface of the light uniformizing element 30 is increased, and the amount of light incident on the light uniformizing element 30 increases. In the present embodiment, the ratio of SC to SI (SC/IS) is 0.9, where SC is the area of the combined image and SI is the area of the entrance surface of the light uniformizing element 30.

Figure 8:
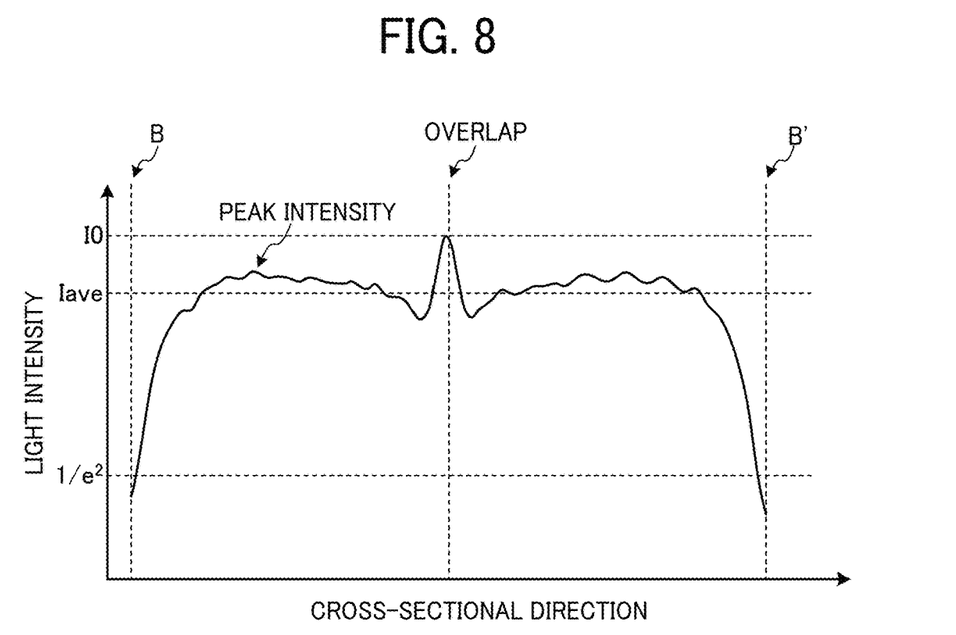
FIG. 8 is a graph of a cross-sectional profile of a distribution of light intensity of the combined image on the plane at the position of the entrance surface of the light uniformizing element.

FIG. 8 is a graph of a cross-sectional profile of a distribution the light intensity of the combined image on the plane at the position of the entrance surface of the light uniformizing element 30. FIG. 8 is a graph of a cross-sectional profile of a distribution of the light intensity on the plane at the position of the entrance surface of the light uniformizing element 30 in the cross section taken along the line (or chain line) B-B' in FIG. 7.

Unlike the distribution of the first embodiment in FIG. 4, the profile in FIG. 8 has a protrusion, which lies above the average Iave of the intensities of $1/e^2$ or more of the peak intensity of the conjugate images in the overlap of the conjugate images. In the present embodiment, I0/Iave is 1.15.

In the present embodiment, as illustrated in FIG. 6, NAI/NAO is 1.1, where NM is a numerical aperture of a bundle of rays on the entrance surface of the light uniformizing element 30 after being emitted from the light source units 20A and 20B, and NAO is a numerical aperture of a bundle of rays emitted from the exit surface of the light uniformizing element 30.

The configuration according to the present embodiment enables conjugate images to be combined while keeping etendue small, and thus increases light use efficiency and miniaturizes the image projection apparatus without reducing the conversion efficiency.

Third Embodiment

The third embodiment differs from the first embodiment in the cross-sectional profile and the area of the combined image. Hereinafter, in a description on the third embodiment, common descriptions between the first and the third embodiments are omitted, and differences therebetween are described.

Figure 9:
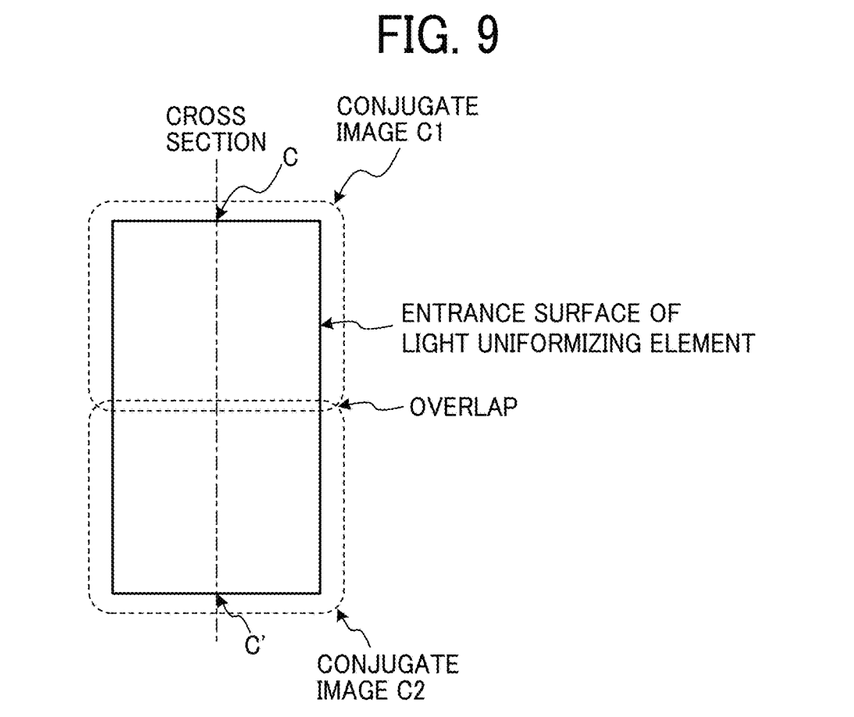
FIG. 9 is an illustration of a combined image of conjugate images on the plane at the position of the entrance surface of light uniformizing element subsequent to the light source device in a projector according to a third embodiment of the present invention.

FIG. 9 is an illustration of a combined image of conjugate images on the plane at the position of the entrance surface of the light uniformizing element 30 subsequent to the light source device 20 in the projector 1 according to the third embodiment. In FIG. 9, the entrance surface of the light uniformizing element 30 is depicted by a solid line, and conjugate images each formed by light emitted from light sources of the laser light source group 21 are depicted by dashed lines.

As illustrated in FIG. 9, the conjugate images each corresponding to light source of the laser light source group 21 are combined to overlap each other on the plane at the position of the entrance surface of the light uniformizing element 30, and the area SC of the combined image is slightly larger than the area SI of the light uniformizing element 30. In the present embodiment, the ratio of SC with respect to SI (SC/SI) is 1.1, where SC is the area of the combined image and SI is the area of the entrance surface of the light uniformizing element 30.

Figure 10:
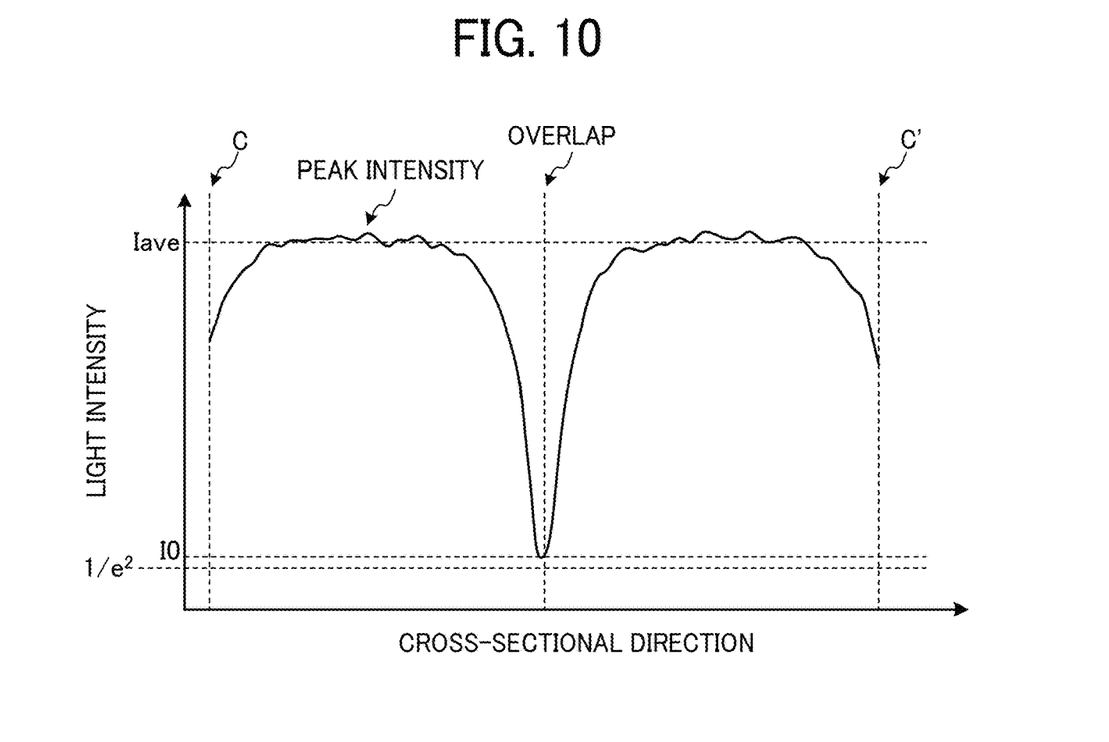
FIG. 10 is a graph of a cross-sectional profile of a distribution of light intensity of the combined image on the plane at the position of the entrance surface of the light uniformizing element.

FIG. 10 is a graph of a cross-sectional profile of a distribution of the light intensity of the combined image on the plane at the position of the entrance surface of the light uniformizing element 30. FIG. 10 is a cross-sectional profile of a distribution of the light intensity on the plane at the position of the entrance surface of the light uniformizing element 30 in the cross section taken along chain line C-C' in FIG. 9.

As illustrated in FIG. 10, the distribution of the light intensity on the plane at the position of the entrance surface of the light uniformizing element 30 is different from the distribution of the light intensity in FIG. 4 of the first embodiment. In the present embodiment, I0/Iave is 0.15, where I0 is the light intensity in the overlap between the conjugate images and Iave is an average intensity of light.

The configuration according to the present embodiment enables conjugate images to be combined while keeping etendue small, and thus increases light use efficiency and miniaturizes the image projection apparatus without reducing the conversion efficiency.

Fourth Embodiment

The fourth embodiment is different from the first embodiment in that four light source units are used to combine optical paths. Hereinafter, in a description on the third embodiment, the common descriptions between the first and the third embodiments are omitted, and differences therebetween are described.

Figure 11:
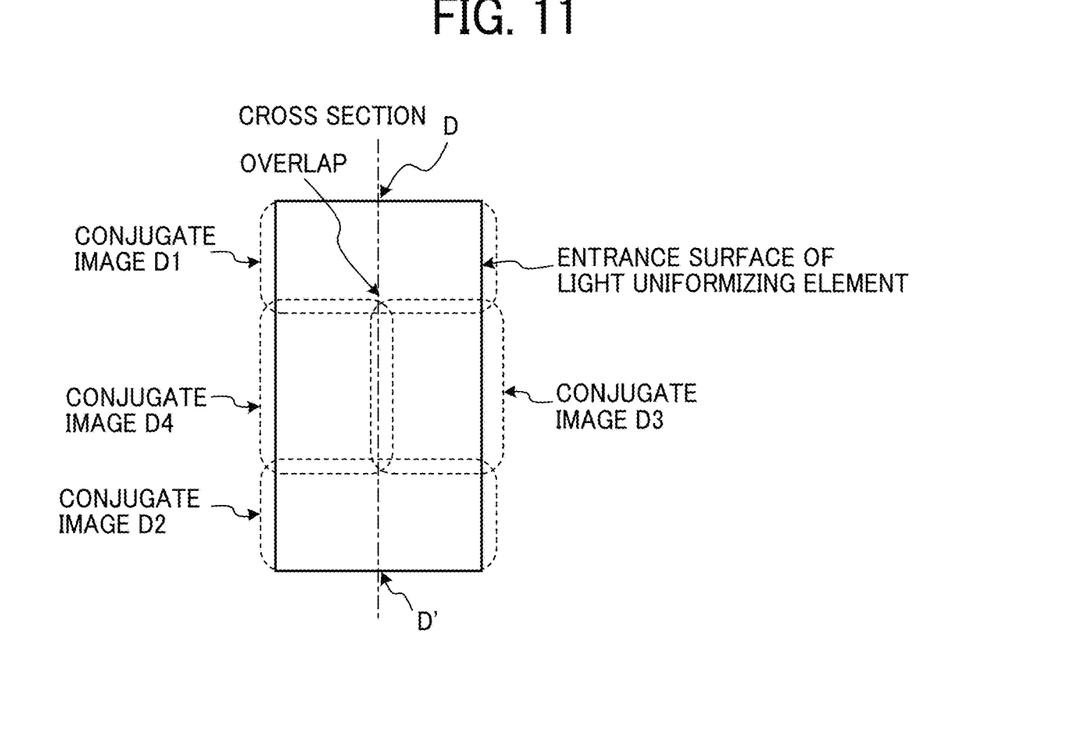
FIG. 11 is an illustration of a combined image of conjugate images on the plane at the position of the entrance surface of the light uniformizing element subsequent to the light source device in a projector according to a fourth embodiment.

FIG. 11 is an illustration of a combined image of conjugate images on the plane at the position of the entrance surface of the light uniformizing element 30 subsequent to the light source device 20 in the projector 1 according to the fourth embodiment. In FIG. 11, the light source device 20 includes four light sources units to combine optical paths. In a method of combining optical paths and conjugate images, for example, a prism may be used. In FIG. 11, the entrance surface of the light uniformizing element 30 is depicted by a solid line, and conjugate images each formed by corresponding light sources of the laser light source group 21 are depicted by dashed lines.

As illustrated in FIG. 11, the conjugate images corresponding to light sources of the laser light source group 21 are adjacently combined to overlap each other on the plane at the position of the entrance surface of the light uniformizing element 30, and the area SC of the combined image is slightly larger than the area SI of the entrance surface of the light uniformizing element 30. In the present embodiment, the ratio of SC with respect to SI is 1.08, where SC is the area of the combined image, and SI is the area of the entrance surface of the uniformizing element.

As illustrated in FIG. 11, the configuration according to the present embodiment allows the opposite conjugate images to have substantially the same shape, and thus increases the light use efficiency. Herein, "substantially the same shape" is achieved: by an optical system in which aberrations are generally corrected; and within general manufacturing tolerances for optical elements, optical units, optical devices, optical apparatuses, and optical systems.

Figure 12:
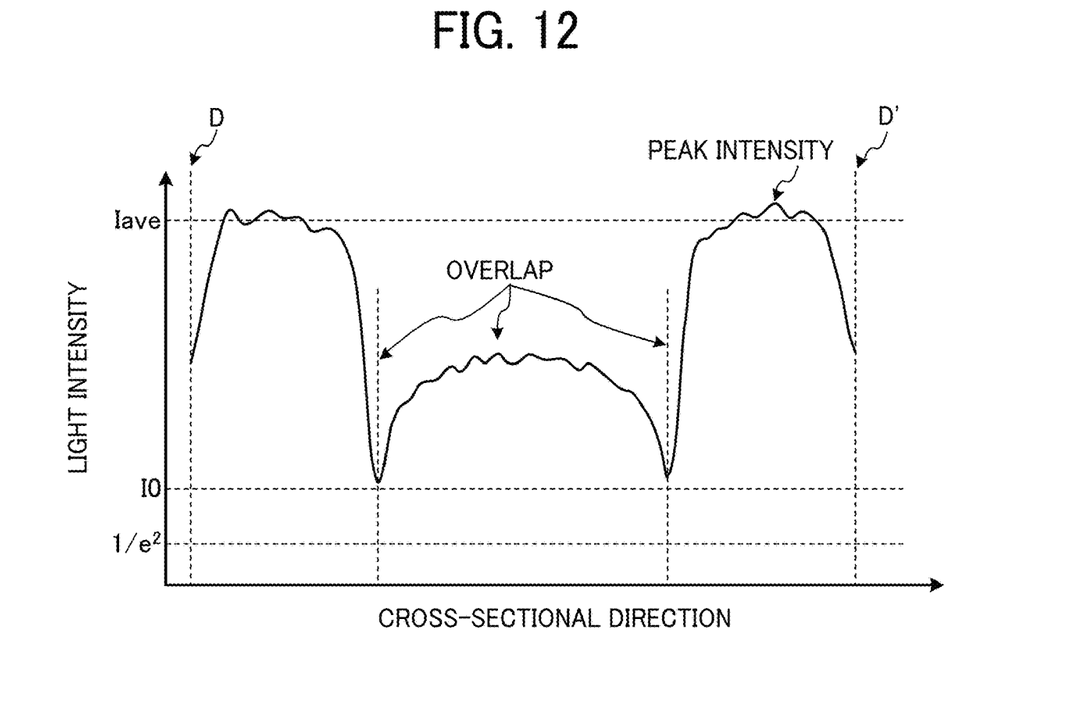
FIG. 12 is a graph of a cross-sectional profile of a distribution of light intensity of the combined image on the plane at the position of the entrance surface of the light uniformizing element.

FIG. 12 is a graph of a cross-sectional profile of the distribution of the light intensity of the combined image on the plane at the position of the entrance surface of the light uniformizing element 30. FIG. 12 is a graph of a cross-sectional profile of the distribution of the light intensity on the plane at the position of the entrance surface of the light uniformizing element 30 in the cross section taken by the chain line D-D' in FIG. 11.

The distribution of the light intensity on the plane at the position of the entrance surface of the light uniformizing element 30 in FIG. 12 differs from that of FIG. 4 of the first embodiment in that the ratio of I0 with respect to Iave (I0/Iave) is 0.2 to 0.4, where Iave is an average of the light intensities equal to or greater than $1/e^2$ of the peak intensity of the conjugate image and I0 is the light intensity of the overlap between conjugate images.

In the present embodiment, all the principal rays of the bundles of rays emitted from the four light source units are perpendicular to the entrance surface of the light uniformizing element 30 while entering the entrance surface thereof. This configuration allows the ratio of NAI with respect to NAO (NAI/NAO) to be1.0, where NM is a numerical aperture of the bundles of rays incident on the light uniformizing element 30 from each light source unit, and NAO is a numerical aperture of the bundle of rays emitted from the light uniformizing element 30.

The configuration according to the present embodiment enables conjugate images to be combined while keeping etendue small, and thus increases light use efficiency and miniaturizes the image projection apparatus without reducing the conversion efficiency.

Figure 13:
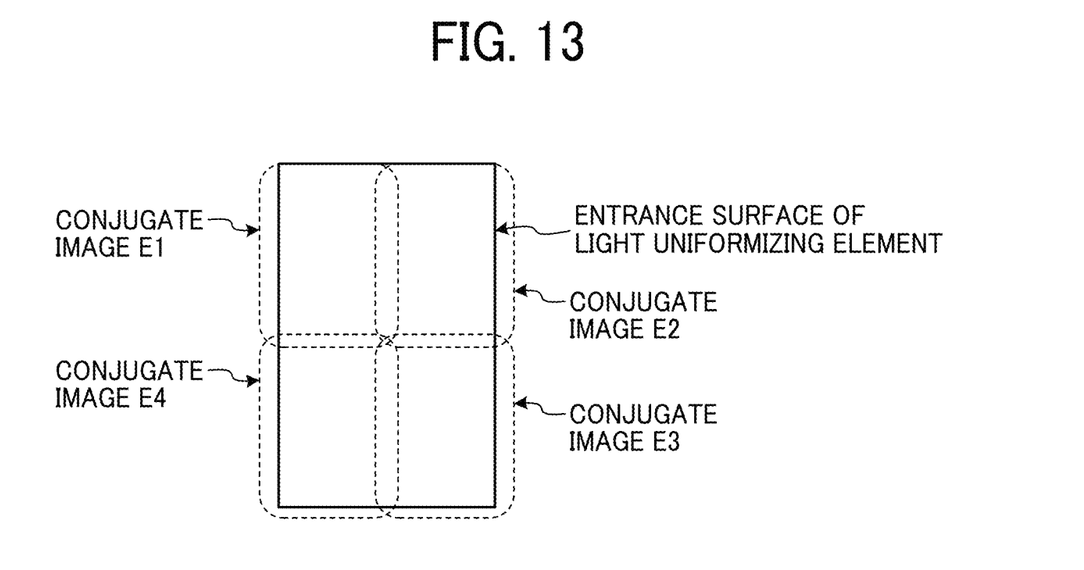
FIG. 13 is an illustration of a modified example of a combined image of conjugate images on the plane at the position of the entrance surface of the light uniformizing element.
Figure 14:
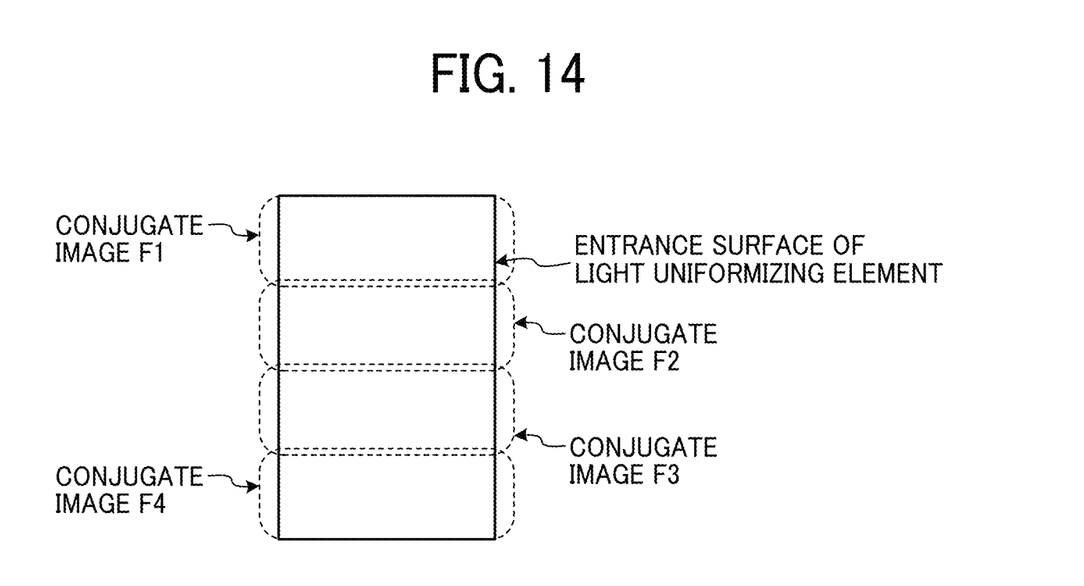
FIG. 14 is an illustration of a modified example of a combined image of conjugate images on the plane at the position of the entrance surface of the light uniformizing element.
Figure 15:
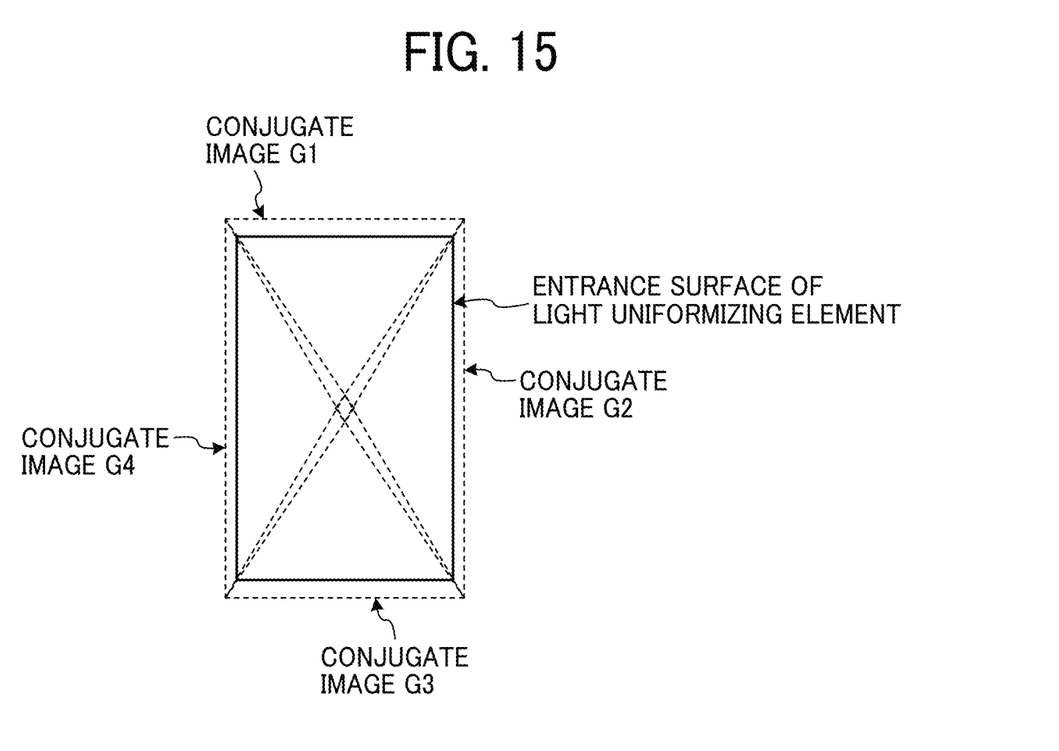
FIG. 15 is an illustration of a modified example of a combined image of conjugate images on the plane at the position of the entrance surface of the light uniformizing element.

In the present embodiment, conjugate images are arranged as illustrated in FIG. 11, but the arrangement of the conjugate of images are not limited thereto. In one or more embodiments, the conjugate image formed by the light emitted from corresponding light source unit has substantially the same shape as that of the entrance surface of the light uniformizing element 30 as illustrated in FIGS. 13, 14, and 15. Herein, "substantially the same shape" is achieved: by an optical system in which aberrations are generally corrected; and within general manufacturing tolerances for optical elements, optical units, optical devices, optical apparatuses, and optical systems. In embodiments in FIGS. 13 and 14, a combined image having a substantially rectangle shape is formed by combining four conjugate images having a substantially rectangle shape. In an embodiment in FIG. 15, a combined image having a substantially rectangle shape is formed by combining four conjugate images having a substantially triangle shape. Herein, "substantially rectangle shape and substantially triangle shape" are achieved: by an optical system in which aberrations are generally corrected; and within general manufacturing tolerances for optical elements, optical units, optical devices, optical apparatuses, and optical systems.

While specific examples desirable for the present disclosure are described in the above-described embodiments; however, the disclosure is not limited to the contents.

In particular, the specific shapes and numerical values of the respective components exemplified in the embodiments are merely examples for implementing the disclosure. The technical scope of the disclosure should not be limitedly interpreted thereby.

As described above, the present invention is not limited to the contents described in each of the above-described embodiments, and can be appropriately modified without departing from the gist thereof.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A light source device comprising:
multiple light source units each including a light source configured to emit a first color light beam, each of the multiple light source units configured to:
convert at least part of the first color light beam into a second color light beam emitted from an emitting region; and
emit the second color light beam to form a conjugate image; and
a light combiner configured to combine the conjugate images formed by the multiple light source units to form a combined image, in which the conjugate images partially overlap each other, on a plane at a position of an entrance surface of a light uniformizing element along a central axis of the light uniformizing element,
wherein a conditional expression below is satisfied:

$$1.3 > SC/SI > 0.7$$

where SC is an area of the combined image in which a light intensity is equal to or greater than $1/e^2$ of a peak intensity of the conjugate images on the plane at the position of the entrance surface of the light uniformizing element, and SI is an area of the entrance surface of the light uniformizing element.

2. The light source device according to claim 1,
wherein a shape of the combined image substantially coincides with a shape of the entrance surface of the light uniformizing element.

3. The light source device according to claim 1,
wherein a conditional expression below is satisfied:

$$0.1 < I0/\text{Iave} < 1.2$$

where I0 is a light intensity of the second color light beams in an overlap between the conjugate images on the plane at the position of the entrance surface of the light uniformizing element, and Iave is an average of the light intensities equal to or greater than $1/e^2$ of the peak intensity of the conjugate images on the plane at the position of the entrance surface of the light uniformizing element.

4. The light source device according to claim 1,
wherein a conditional expression below is satisfied:

$$0.8 < NAI/NAO < 1.2$$

where NAI is a numerical aperture of the second color light beam incident on the light uniformizing element, and NAO is a numerical aperture of light emitted by the light uniformizing element.

5. The light source device according to claim 1,
wherein at least two of the multiple light source units emit the second color light beams in directions substantially parallel to each other.

6. The light source device according to claim 1,
wherein the multiple light source units are arranged symmetrically with respect to the central axis of the light uniformizing element.

7. The light source device according to claim 1,
wherein at least two of the multiple light sources form the conjugate images having substantially the same shape.

8. The light source device according to claim 1,
wherein a conditional expression below is satisfied:

$$0 \le \theta < 10 \text{ degrees}$$

where θ (degree) is an incident angle defined by a principal ray of each of the second color light beams incident on the entrance surface of the light uniformizing element and a normal line of the entrance surface of the light uniformizing element.

9. An image projection apparatus comprising:
the light source device according to claim 1;
a light uniformizing element configured to uniformize light intensities of the second color light beams incident thereon from the multiple light source devices and emit the second color light beams having a uniform light intensity;
an image display element configured to modulate light from the light uniformizing element to form an image; and
a projection optical system configured to magnify and project the image onto a projection surface.

10. A light source optical system comprising:
multiple wavelength conversion elements each configured to convert at least part of a first color light beam emitted by a light source into a second color light beam, and emit the second color light beam to form a conjugate image; and
a light combiner configured to combine the conjugate images formed by the multiple wavelength conversion elements to form a combined image, in which the conjugate images partially overlap each other, on a plane at a position of an entrance surface of a light uniformizing element along a central axis of the light uniformizing element, wherein a conditional expression below is satisfied:

$$1.3 > SC/SI > 0.7$$

where SC is an area of the combined image in which a light intensity is equal to or greater than $1/e^2$ of a peak intensity of the conjugate images on the plane at the position of the entrance surface of the light uniformizing element, and SI is an area of the entrance surface of the light uniformizing element.

* * * * *